May 11, 1954
E. ST. JOHN
2,677,863
CLEAT AND FASTENING DEVICE
Filed July 14, 1950
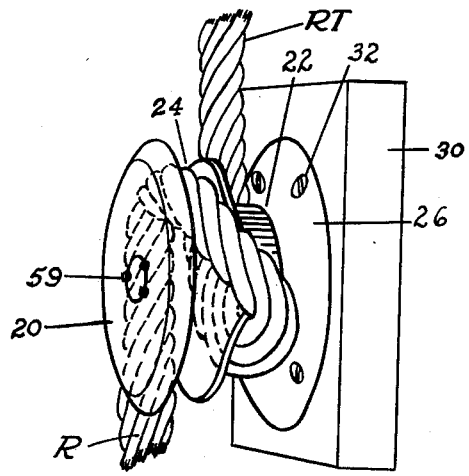
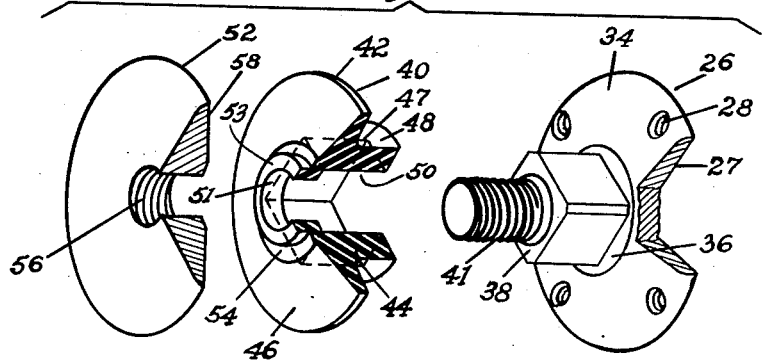
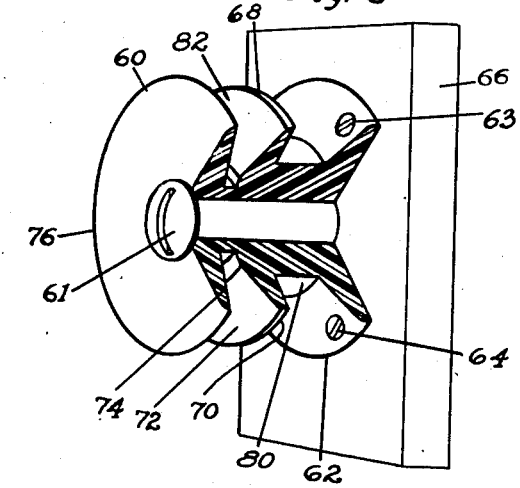
INVENTOR
EVERETT ST JOHN
BY
Wentworth B. Clapham
ATTORNEY Patented May 11, 1954

2,677,863

UNITED STATES PATENT OFFICE 2,677,863

CLEAT AND FASTENING DEVICE

Everett St. John, Noroton, Conn.

Application July 14, 1950, Serial No. 173,703

7 Claims. (Cl. 24—127)

This invention relates to cleats and fastening devices and more especially to an improved type of cleat and fastening device having means for securely holding a rope or line turned therearound without kinking, chafing or damage to the fibres thereof, and also having means for providing easy snubbing of a rope or line when it is desired to pay out or pull in the rope or line.

With known types of cleats in which a line is turned in a figure eight pattern, the turns are made around such small radii that kinking of the line occurs, and injury to the line is probable. Furthermore, in order to insure that a line will be held securely, more turns are required, and if the free end of the line is half hitched to prevent slipping, delay and jambing are likely, when attempting to release the line. With this type of cleat, at times, especially when a line is wet, it is extremely difficult to effect its release, and it is only with great difficulty and with loss of time that it is finally released. It is also to be noted that lines which have been fastened about this type of cleat will not coil properly due to the "set" taken by kinks formed therein because of being turned about the cleat.

There are also a number of so-called jamb cleats which are used chiefly on sailing boats. This type of cleat depends upon some form of cam action or cam surfaces for their operation. The cam surfaces are usually roughened to provide a better grip. They provide a quick and effective grip on the rope or line, but at the cost of chafing of the line or rope, and breakage of fibres at the points where the rope or line is crushed between the gripping jaws.

The present invention provides a solution of these problems. This is because the invention provides a quick-acting cleat which effectively holds and secures a line or rope against slippage, without any damage to its fibers or formation of kinks which also might cause subsequent deterioration of the rope and lessen its useful life.

The round turn cleat of the invention provides secure attachment of a line when two turns are taken about it, and the free end is pulled taut. This causes a wedging of the rope or line between parts of the cleat and also a flexing of the center member or portion of the cleat which results in a resilient frictional secure gripping of the line or rope.

The design of the novel cleat herein disclosed permits a wide range of use with a wide range of rope sizes with each size of cleat. The cleat is provided with two axially spaced rope or line receiving circular grooves. Preferably, one of these grooves, which may be termed the lower or bottom groove, is of such size and shape that the maximum size of rope will rest on the bottom of the groove without wedging between the sides. This permits the rope to be payed out with any desired degree of snubbing action by taking a quarter turn or more as required by the pull on the line or rope. The upper or top groove of the cleat with its opposed flat conical or slanting sides or surfaces, which is substantially V-shaped, provides a grip for the last turn when the line or rope is positioned in the groove and pulled taut, besides providing additional snubbing action because of the frictional contact and the flexure exerted by the surface of the center member against the line or rope. The line is securely fastened, but quickly and easily released with no chance of jambing, as in the case of prior art types of cleats. As described hereinafter, attachment of a line or rope may be made in either direction. These advantages are obtained without chafing of the line or rope, or other injury thereto, because the line or rope is wound around a comparatively soft or resilient material providing sufficient radius to avoid kinking and breakage of the fibres of the line or rope.

It is an object of the invention to provide a novel, quick-acting cleat or fastening device in which a rope or line can be securely fastened with a minimum of effort, and in which the line or rope is subjected to substantially no damage at any time in its use.

The invention is further characterized by the provision of a novel cleat having substantially parallel, spaced rope or line receiving grooves formed by a central member and coaxially arranged top and bottom members spaced from the top and bottom faces of the center member which is flexible, and provides a resilient friction-locking surface relative to a rope or line positioned in said grooves and wound about the cleat.

The invention also consists of a novel cleat formed with two axially spaced rope or line receiving grooves, and means for resiliently gripping and frictionally holding a line or rope located in the grooves against unfastening or slippage therefrom.

With the aforesaid, and other objects not specifically mentioned, in view, the invention consists in the novel combinations and arrangements of parts hereinafter described in the preferred embodiments, pointed out in the subjoined claims, and illustrated in the annexed drawings, wherein the same or like parts are designated by the same reference characters throughout the several views.

In the drawings:

Figure 1 is a perspective view of a preferred form of the cleat or fastening device embodying the invention showing the manner in which a rope or line is secured thereabout.

Figure 2 is an exploded view showing the several parts of the cleat or fastening device disclosed in Figure 1.

Figure 3 is a view, partly in section, showing a modified form of the invention.

Referring to Figures 1 and 2, the cleat or fastening device indicated generally 20 consists of three parts. A base or bottom member 26, a center part or ring member 40 and a top member 52. Base 26 in the form shown, is circular in shape and has a flat bottom face 27 which fits against the object to which the cleat 20 is to be secured. Openings or holes 28 in base 26 provide means by which screws 32 may be used to attach the cleat to an object, such as the deck of a boat 30, a portion of which is shown in Figure 1. Base 26 can also be provided with a threaded base (not shown) used in conjunction with screws 32, into which can be threaded a screw (not shown) projecting through the work to which cleat 20 is attached. The top face 34 of base 26 may be inclined or shaped generally like a flat cone and is provided with a central rim 36 from which projects a lug 38 having an elongated threaded rod extension 41. Lug 38 is formed integrally with base 26, as shown, or if desired, can be attached thereto in any suitable manner. In Figure 2, lug 38 is approximately square in cross-section, and has its corners shaved off. If desired, lug 38 could have any other suitable cross-section. The function of lug 38 is described hereinafter.

In the preferred embodiment of the invention shown in Figures 1 and 2, base 26 is made of metal. Preferably a metal is selected which will not rust or scale. For most purposes, experience has shown that bronze, brass or stainless steel will give good results. A good grade of galvanized metal will also function satisfactorily.

Center part or ring member 40 is formed of a material which is not only flexible but also, preferably, provides a frictional contact to a rope or line turned about cleat 20. Materials which have been found to be suitable are natural rubber, synthetic rubber, such as "neoprene," and other synthetic rubbers, and compositions of natural and synthetic rubbers, plastics, such as vinyl chloride compositions, and other synthetic materials which have characteristics mentioned above and are durable, will not tear readily, and are not attacked by the elements, i. e. salt spray, exposure to the sun, or the like. If desired, especially in the use of plastics other than rubber, the faces of ring member 40 may be roughened in any known manner so as to provide frictional rope or line engaging surfaces. Ring member 40, shown in Figures 1 and 2, can be removed and replaced when it is deemed advisable to replace it because of injury or damage or wear caused by long use. Ring member 40 not only functions as the means for insuring easy and proper snubbing of a rope or line, but also functions in and as a part of cleat 20 as a flexible and resilient wedging element in insuring that the rope or line when turned properly thereabout will be firmly held and cannot slip unless and until it is actually released.

As shown in detail in Figure 2, ring member 40, which may be formed in any suitable manner, as by molding or turning, consists of a ring portion 42, somewhat smaller in diameter than base 26, having a flat bottom face 44 and a top face 46, having inclined sides or shaped generally in the form of a flat cone. Projecting outwardly from flat bottom face 44 is a hub 48 having a central bore 50, shaped to conform with lug 38 such that when the parts of device 20 are assembled, hub 48 fits snugly upon lug 38 with its bottom edge 48 resting upon rim 36. When so assembled, ring member 40 is held upon base 26 against turning, and threaded rod portion 41 projects through bore 51 in hub 53 which protrudes from a rim 54 formed on the top face 46 of ring member 40.

Top member 52, like base 26, preferably is formed of metal, the metal used for base 26 being satisfactory. Member 52, which has substantially the same diameter as ring portion 42, is formed with a central threaded bore 56 by means of which member 52 can be turned upon threaded rod 42 when assembled in operative relationship with ring member 40 and base 26. It is held in assembled position in any suitable manner, as by staking shown at 59, or by a suitable nut and lock washer (not shown). If the latter are used, the threaded rod 42 is made longer in order that it may receive both the nut and the washer.

It will be noted that the under surface or bottom face 58 of member 52, like the top face 46 of ring member 40, has inclined sides, or is shaped like a flat cone, the inclination preferably being the same as that for ring member 40 but the opposite thereof. Face 58 is also provided with a rim or edge which fits against the top edge of hub 53 of ring member 40. Altho either or both faces 46 and 58 could be flat, it has been found that best results are obtained, and a wide range of ropes and lines can be used, when these faces are inclined and diverge outwardly, as shown.

Figure 1 shows the three parts of cleat 20 or fastening device assembled and secured together in operative relationship, with a rope or line R turned thereabout. When so used, cleat 20 will prevent rope portion RT from slipping until rope or line portion R is actually unwound manually. When the parts of device 20 are assembled, it has two operative grooves, i. e. a snubbing groove 22 and a securing groove 24. The snubbing groove 22 is formed by the top face of base 26 and the under face 44 of flexible ring member 40. Preferably where face 44 joins hub 48, a radius 47 is provided, since this forms a rounded top for groove 22 in which the rope or line can be paid out when desired and/or necessary. The frictional nature or surface of the material of ring 40 and the surface of the outer face of hub 48 insures proper friction upon the rope or line during this operation. When sufficient snubbing has been effected, the free end of rope or line R is turned about groove 24, where it is wedged between the faces 46 and 58, and securely held therebetween until released manually. It will be noted that, as shown in Figure 1, where the rope or line passes from groove 22 to groove 24, there is a definite flexing of ring 42. This places an actual tension on the line such that, with the wedging action caused by the positioning of the rope or line between faces 46 and 58, considerable force must be exerted to cause the rope or line to slip. The position occupied by a rope or line R between wedging faces 46 and 58 depends upon the diameter of the rope or line. The smaller the rope or line, the nearer to the base of groove 24 is it seated.

In the operation of cleat 20, it is evident that, at all times, a rope or line is not subjected to twisting by being turned about a small radius such that kinks will be made in the rope or line. Also, the rope or line is not subjected to chafing. The use of the cleat or fastening device which constitutes the invention results, therefore, in greatly increased life to ropes and lines, and also freedom from danger of undesired loosening which might cause trouble.

The cleat made in accordance with the invention can be used with a wide range of ropes and lines. The width and depth of groove 22 is so made that the width is a measure of the largest size of rope or line to be used. The wedge shape of groove 24 and the fact that member 40 is a flexible and/or resilient material insures that so long as a rope or line can fit in groove 22, it can be used successfully and be held by cleat 20, clamped between rigid member 52 and ring member 40. The axial distance between the edges of faces 46 and 58 adjacent hub 53 should always be less than the diameter of a rope or line to be used with cleat 20. So long as this is so, cleat 20 will hold any rope or line used therewith.

Figure 3 discloses a modified form of the invention in which the cleat or fastening device illustrated is formed in a single unit, the several rope or line engaging parts being molded or cast as an integral unit. The material used may be the same as employed in ring member 40, described hereinabove. Device 60 is provided with a central bore through which passes a suitable bolt or screw 61 by means of which it can be fastened to the object on which it is mounted. If a square bolt or screw is used, cleat 60 will be held in operative position without turning. If a round bolt or screw is used, base 62 may be provided with holes 63 through which screws 64 can be inserted to attach it to work 66. Ring member or center part 68 is formed with a flat bottom face 70 and a top inclined face 72, which as in cleat 20 shown in Figures 1 and 2, is opposed to co-acting inclined face 74 of top portion 76. The three parts together cooperate in the same manner as in the case of the preferred form of the invention and provide a snubbing groove 80, and a rope or line wedging and securing groove 82. The operation of device 60 is the same as that of cleat or fastening device 20.

While cleats and fastening devices made in accordance with the invention are readily adaptable for use on ships, boats, and the like, they are also useable on trucks, wagons and the like. For example, tarpaulins covering loads being hauled on trucks and railroad cars often have lines or ropes which can be held securely in place if turned about fastening devices embodying the invention disclosed herein. Other uses, as with awnings and Venetian blinds which involve the use of single or double ropes or lines, are obvious.

The invention above described may be varied in construction within the scope of the claims, for the particular embodiments selected to illustrate the invention, are but two of many possible concrete embodiments of the same. It is not, therefore, to be restricted to the precise details of the structure shown and described.

What is claimed is:

1. A cleat or fastening device comprising an elongated body member, a disc-shaped portion formed adjacent one end of said member, an intermediate flexible rubber disc-shaped portion formed generally centrally of said member, and a disc-shaped top portion formed adjacent the opposite end of said member, said first named disc-shaped portion and the face of said intermediate disc portion opposed thereto forming a generally U-shaped rope or line snubbing and holding groove, and said other face of said intermediate disc portion and the face of said disc top portion opposed to said last-named face of said intermediate portion forming a substantially V-shaped groove for receiving and wedging a rope turned about said cleat or fastening device and located in said first named groove against slipping and removal.

2. A cleat or fastening device of the type described comprising a base member, an intermediate resilient flexible member coaxial with said base member and provided with a face spaced from said base member and forming therewith a rope or line snubbing and holding groove substantially U-shaped in cross section, an outer member mounted in coaxial arrangement with said intermediate resilient flexible member, and provided with a face forming with said resilient flexible intermediate member a wedge-shaped rope or line clamping and securing groove whereby a rope or line seated in said first-named groove, turned thereabout and passing over the edge of said resilient flexible member and positioned in said second-named groove, flexes said member and is held wedged firmly and resiliently in said second-named groove against slipping and loosening.

3. A cleat or fastening device of the type described comprising a circular metal base member having a top rope or line engaging surface, a resilient flexible plastic center member having a hub bearing against said surface and spacing the under face of said flexible center member from said base member a distance providing a rope or line receiving and snubbing groove, the minimum spacing of said base member and said resilient flexible center member being substantially equal to the diameter of the largest rope or line to be used with said device, said center member also being provided with a hub projecting from its top face, said top face having a rope or line engaging face, a top metal member bearing against said last named hub, and provided with a face opposed to said last-named face of said center member and forming therewith a wedge-shaped rope or line receiving and wedging groove, said center member flexing a rope or line positioned in said grooves, whereby said rope or line is frictionally and resiliently held against slipping and loosening.

4. A cleat or fastening device of the type described comprising a base member having a top rope or line engaging surface, a resilient flexible center member having a hub bearing against said surface and spacing the under face of said flexible center member from said base member a distance providing a generally U-shaped rope or line receiving and snubbing groove, said center member also being provided with a hub projecting from its top face, said top face having a rope or line engaging face, a top member bearing against said last named hub, and provided with a face opposed to said last-named face of said center member and forming therewith a wedge-shaped rope or line receiving and wedging groove, said center member being adapted to flex when a rope or line is turned about said cleat or fastening device and positioned in said grooves, whereby said rope or line located in said first-named groove and extending over said flexed center member into said second-named groove is frictionally and resiliently held against slipping and loosening.

5. A fastening device of the type described comprising a base member having a rope or line receiving surface, a resilient flexible disc of synthetic rubber mounted upon and coaxial with said base member, said disc forming with said surface of said base member a generally U-shaped rope or line snubbing groove, a third member mounted upon and coaxially arranged relative to said resilient flexible disc, said disc and said third member having opposed groove forming surfaces forming a circular wedge-shaped rope or line clamping groove, whereby a rope seated in and snubbed by said first-named groove, and passing therefrom into said second-named groove flexes said resilient flexible disc and locks said rope or line wound about and lodged in said wedge-shaped groove.

6. A fastening device of the type described comprising a base member having an upper surface upon which a rope or line is adapted to rest, a polygonal hub projecting outwardly beyond said surface, and a threaded rod formed on and extending outwardly from said hub, an intermediate member of resilient flexible material having a hub formed centrally thereof and provided with an axial bore conforming in cross-section to the cross-sectional shape of said hub on said base member, whereby said intermediate member may seat snugly upon said hub and be held against turning, a hub formed on the other face of said intermediate member and extending outwardly thereupon, said last-named hub having an axial bore accommodating said threaded rod, said rod extending through and beyond said last-named hub, an outer member provided with a central threaded bore adapted to be screwed upon said threaded rod, and bear upon the top of said last named hub, said intermediate member and said base member having opposed faces forming with said first-named hub a rope or line receiving and snubbing groove, and said ring member and said outer member having opposed faces forming a substantially V-shaped rope or line receiving and wedging groove, whereby a rope or line wound about said first-named hub and lying in said first-named groove in passing from said first-named groove flexes a portion of said resilient flexible intermediate member and lies in said wedge-shaped groove securely holding said rope or line from slipping or loosening, and means for attaching said device to a support.

7. A cleat or fastening device of the type defined comprising a base member, an intermediate member formed of flexible rubber and provided with outwardly extending hubs, an outer member arranged coaxially with said base member and said center member, and means securing said members together in operative relationship, said hub separating said members, and forming with the opposed faces of said members rope or line receiving and wedging grooves, said groove formed by said base member and said intermediate member having a flat side and an inclined side in which a rope or line may be seated loosely and be held by frictional engagement with the outer surface of the wall of said hub against free movement when said rope or line is paid out or pulled in, said groove formed by the opposed faces of said intermediate and outer members being substantially wedge-shaped and operative to frictionally and resiliently secure a rope turned about said cleat and lying in said last-named groove.

References Cited in the file of this patent

UNITED STATES PATENTS

| Number | Name | Date |
|---|---|---|
| 160,591 | Harvey | Mar. 9, 1875 |
| 479,218 | Koppenhofer | July 19, 1892 |
| 886,905 | Ward | May 5, 1908 |
| 895,403 | Jackson | Aug. 4, 1908 |
| 2,202,968 | Simler | June 4, 1940 |

FOREIGN PATENTS

| Number | Country | Date |
|---|---|---|
| 2,065 | Great Britain | Jan. 24, 1884 |
| 10,217 | Great Britain | 1890 |
| 399,305 | Great Britain | Aug. 24, 1932 |